(12) United States Patent
Smith

(10) Patent No.: US 6,646,559 B2
(45) Date of Patent: *Nov. 11, 2003

(54) METHOD AND APPARATUS FOR ACTIVATING WARNING DEVICES

(75) Inventor: Michael Smith, Wichita, KS (US)

(73) Assignee: User-Centric Enterprises, Inc., Wichita, KS (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/079,570

(22) Filed: Feb. 22, 2002

(65) Prior Publication Data

US 2002/0080038 A1 Jun. 27, 2002

Related U.S. Application Data

(63) Continuation-in-part of application No. 09/649,582, filed on Aug. 29, 2000, now Pat. No. 6,351,218.

(51) Int. Cl.[7] .................................................. G01W 1/00
(52) U.S. Cl. ............. 340/601; 340/286.01; 340/286.14; 73/170.16; 342/26; 345/349; 702/2; 702/3
(58) Field of Search ........................... 340/601, 286.01, 340/286.14, 531, 539, 628; 73/170.16; 342/26; 345/339, 349, 1.1, 1.2, 2.1, 2.2, 2.3; 702/2, 3

(56) References Cited

U.S. PATENT DOCUMENTS

| | | | |
|---|---|---|---|
| 4,812,825 A | | 3/1989 | Kennedy et al. |
| 5,517,193 A | * | 5/1996 | Allison et al. ................. 342/26 |
| 5,905,438 A | * | 5/1999 | Weiss et al. ................. 340/636 |
| 6,018,699 A | * | 1/2000 | Baron, Sr. et al. ............... 702/3 |
| 6,023,223 A | | 2/2000 | Baxter, Jr. |
| 6,031,455 A | * | 2/2000 | Grube et al. ................. 340/539 |
| 6,034,608 A | | 3/2000 | Frank et al. |
| 6,112,074 A | * | 8/2000 | Pinder ........................ 455/404 |
| 6,112,075 A | | 8/2000 | Weiser |
| 6,118,230 A | | 9/2000 | Fleischmann |
| 6,125,328 A | | 9/2000 | Baron et al. |
| 6,160,551 A | | 12/2000 | Naughton et al. |
| 6,255,953 B1 | * | 7/2001 | Barber ........................ 340/601 |
| 6,295,001 B1 | | 9/2001 | Barber |
| 6,351,218 B1 | * | 2/2002 | Smith ......................... 340/601 |
| 6,369,705 B1 | * | 4/2002 | Kennedy ..................... 340/506 |

OTHER PUBLICATIONS

"FWS Product Line" Information taken from Federal Signal 4, 2000, 3 pages.

"Federal Commander Digital System" Federal Signal Corporation, 3 pages.

"Tornado Warning Sirens and Employee Alarm Systems Designed by SafetyCom, Inc." Information taken from SafetyCom, Inc. website (www.safetycom.com) printed on Jul. 25, 2000, 2 pages.

(List continued on next page.)

Primary Examiner—Daniel J. Wu
Assistant Examiner—Davetta W. Goins
(74) Attorney, Agent, or Firm—Banner & Witcoff, Ltd.

(57) ABSTRACT

The invention provides a system and method for activating one or more warning devices, such as weather warning sirens, environmental warning devices, flash flood gates, and the like, from a remote or central location. Warning devices situated across geographically dispersed areas can be remotely controlled from a central location, such as a weather center, on the basis of detected and predicted weather patterns and other environmentally hazardous events. One or more warning devices can be quickly and easily activated through a computer-implemented user interface that allows a user to select a group of warning devices that are in the path of an approaching hazardous event. Each warning device is activated through a communication line that transmits an activation code to each device. Each device provides confirmation that it has been activated, and the resulting activation is indicated on a computer screen.

26 Claims, 6 Drawing Sheets

OTHER PUBLICATIONS

"Federal Controller Two–Way" Information taken from website (www.federalwarningsystems.com/fct.htm) printed on Jul. 25, 2000, 4 pages.

"2001 Siren" Federal Signal Corporation, 2 pages.

"Federal Controller" Information taken from website (www.federalwarningsystems.com/fc.htm) printed on Jul. 24, 2000, 2 pages.

"2001 Siren Electro–Mechanical Siren" Information taken from website (www.federalwarningsystem.com/2001.htm), 2 pages.

"E–969 Encoder: Activation Control" Information taken from SafetyCom, Inc. website (www.safetycom.com/Products/E969.html), printed on Jul. 25, 2000, 2 pages.

"VA–2000 Alertmonitor: Instant Audible and Visual Emergency Information", Information taken from SafetyCom, Inc. website (www.safetycom.com/Products/VA2000.html), printed on Jul. 25, 2000, 2 pages.

". . . Long Distance Warning Systems for Community Applications from Whelen and Safetyco" and "Directional Siren System for Community or Industrial Applications form Whelen and . . " Information taken from SafetyCom, Inc. website (www.safetycom.com) printed Jul. 25, 2000, 5 pages.

"Modulator Siren Controller" and "SS200, Siren Encoder/Controller" Information taken from website www.federalwarningsystems.com), printed on Jul. 24, 2000, 10 pages.

* cited by examiner

METHOD AND APPARATUS FOR ACTIVATING WARNING DEVICES

CROSS REFERENCE TO RELATED APPLICATION

This application is a continuation-in-part of and claims priority from application Ser. No. 09/649,582, entitled METHOD AND APPARATUS FOR ACTIVATING WEATHER WARNING DEVICES, filed Aug. 29, 2000, now U.S. Pat. No. 6,351,218, granted Feb. 26, 2002.

TECHNICAL FIELD

The present invention relates generally to warning systems. More particularly, the invention provides a method and apparatus for remotely activating one or more warning devices that may be dispersed across a geographic area.

BACKGROUND OF THE INVENTION

Tornadoes cause widespread damage each year in the United States. In order to help minimize loss of life, many municipalities have installed tornado sirens that are activated when an approaching tornado is detected. Federal Signal Corporation of University Park, Ill., manufactures various sirens and controllers that can be activated when authorities determine that an emergency is imminent. SafetyCom Incorporated of Little Rock, Ark., similarly provides various sirens to warn residents of emergencies. Other systems are exemplified by U.S. Pat. Nos. 4,812,825 ("Tornado Warning System") and 6,034,608 ("Tornado Alarm System").

Although tornado sirens allow residents to take shelter in the event of an impending tornado, the means by which the sirens are activated sometimes results in alarming residents who are in no real danger of being affected by a tornado. Tornado sirens are often activated on a county-wide basis, thus alarming many residents who are far from the projected tornado path, but who happen to be within the county or predetermined geographic zone that is associated with an impending tornado risk. Alternatively, in some communities, emergency operators manually activate individual sirens based on a visual comparison of weather displays (or text descriptions of displays provided by the National Weather Service) with geographic maps showing the location of sirens in the area serviced by the emergency center.

In the latter situation, errors can arise based on the need to visually compare and judge distances and features on two different displays. Moreover, where only a generalized tornado warning is received, employees must use their discretion in determining whether to activate a given siren. The time required to translate a given warning into siren activation signals and the lack of meteorological training of many municipal or county employees can result in errors, delays, and false alarms.

Another problem relates to reliance on radio frequency transmission paths to activate individual sirens. Sirens are typically activated from a central control unit (e.g., a county-wide unit) by transmitting radio control signals over police radio frequencies, which can sometimes become so crowded or jammed during a weather emergency that radio control signals may not be received. It can also be difficult to determine whether a given siren has actually been activated after a signal has been sent.

It is expensive for municipalities to pay for employees to monitor and respond to tornado threats by activating sirens. For a small county with a few sirens, the job function maybe shared by an emergency 911 operator or a fire marshal, who often have other duties and job responsibilities. Counties or cities often cannot afford full-time meteorologists to pinpoint the likely path of a tornado and communicate that information to a county emergency center, which must then compare the warning information to a map showing the location of various sirens within the county or city. Two adjacent counties may have separate, incompatible warning systems that are operated by different people and activated on the basis of different information.

In addition to tornados, other meteorological and non-meteorological conditions can present substantial threats to a community as well. These include other meteorological phenomena such as flash floods, lightning strikes, and other dangerous meteorological conditions, as well as non-meteorological conditions such as a threat from a release of a hazardous material, volcanic eruption, pollution, and the like.

The aforementioned problems give rise to the solutions provided by the present invention.

SUMMARY OF THE INVENTION

The invention provides a system and method for activating warning devices, such as tornado sirens, in conjunction with a meteorological map display that shows the actual and/or predicted path of a tornado or other meteorological event. In one variation of the invention, a user can manually select one or more tornado warning devices by drawing a box or other encircling indicator around icons on a computer screen each representing the location of a tornado warning device. The selection can be made on a computer screen that simultaneously shows both the meteorological event and the location of each warning device. In another variation, activation can occur automatically by computer based on a comparison of a tornado location with the location of one or more warning devices.

A central weather prediction center can be remotely coupled to a plurality of tornado warning devices in dispersed geographic regions (e.g., different cities, counties, or states), thus avoiding the need for persons located in each of those regions to be responsible for activating sirens in the particular region. Remote activation can occur over telephone lines, packet switched networks, the Internet, frame relay networks, and the like.

Some aspects of the invention activate warning devices based on non-meteorological hazardous events, such as a release of hazardous materials, air pollution, volcanic eruption, and the like, based on a predicted or known plume associated with the affected area.

DETAILED DESCRIPTION OF THE INVENTION

Figure 1:
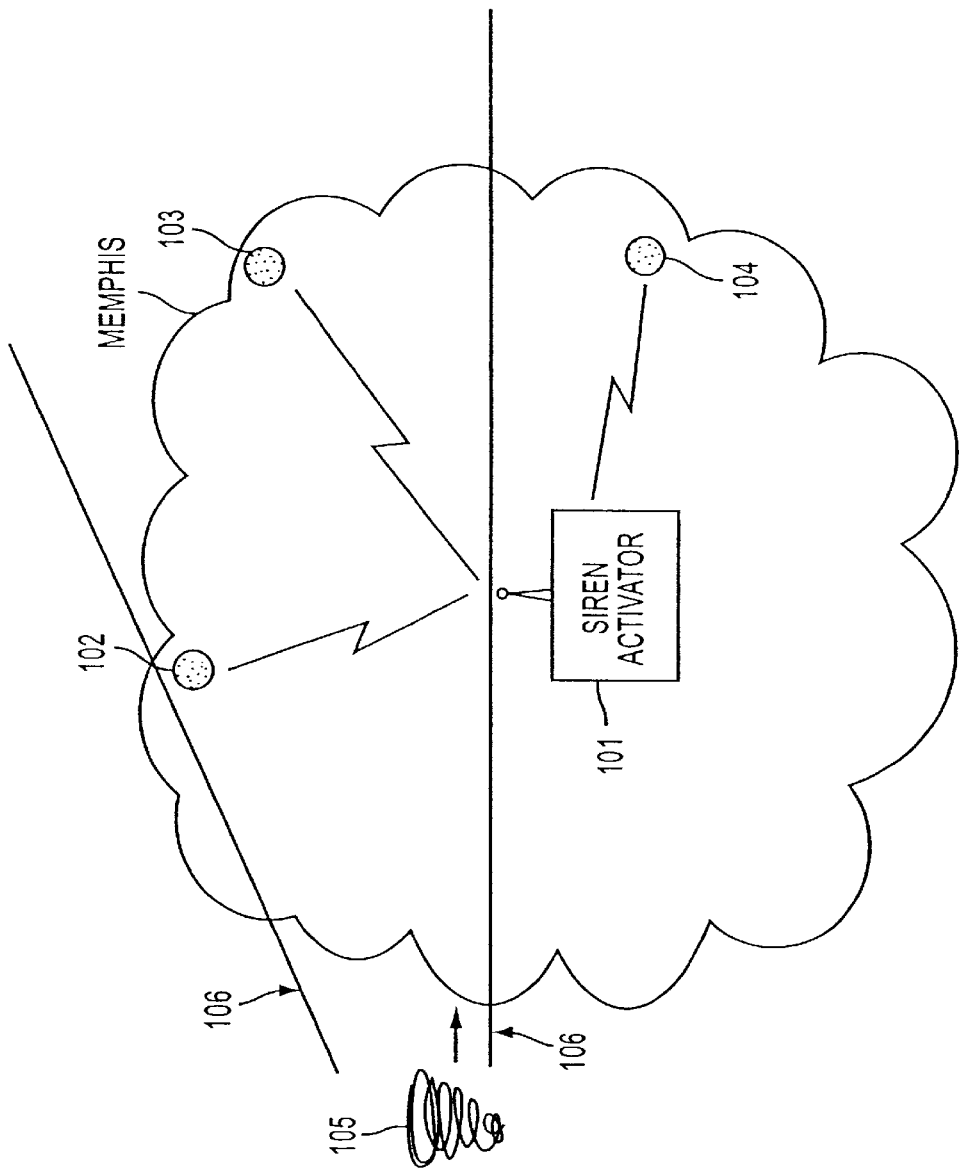
FIG. 1 shows a conventional approach for activating individual warning devices in a given geographic region by using a centralized siren activator 101.

FIG. 1 shows a conventional approach for activating warning devices, such as tornado warning sirens. A municipality (e.g., Memphis) typically has a centralized siren activation unit 101 that is coupled to a plurality of warning devices 102 through 104. The activation unit 101 may be located in the basement of a municipal facility (e.g., a police station or emergency dispatch center). The activation unit can selectively activate one or more warning devices by transmitting a radio frequency signal over an available channel, such as a shared police band. Activation is performed by a human, who receives information suggesting that a tornado 105 is headed for the county. Such information may be provided by the National Weather Service, which issues warnings on a regional (e.g., county) basis, sometimes including a projected path 106.

Figure 2A:
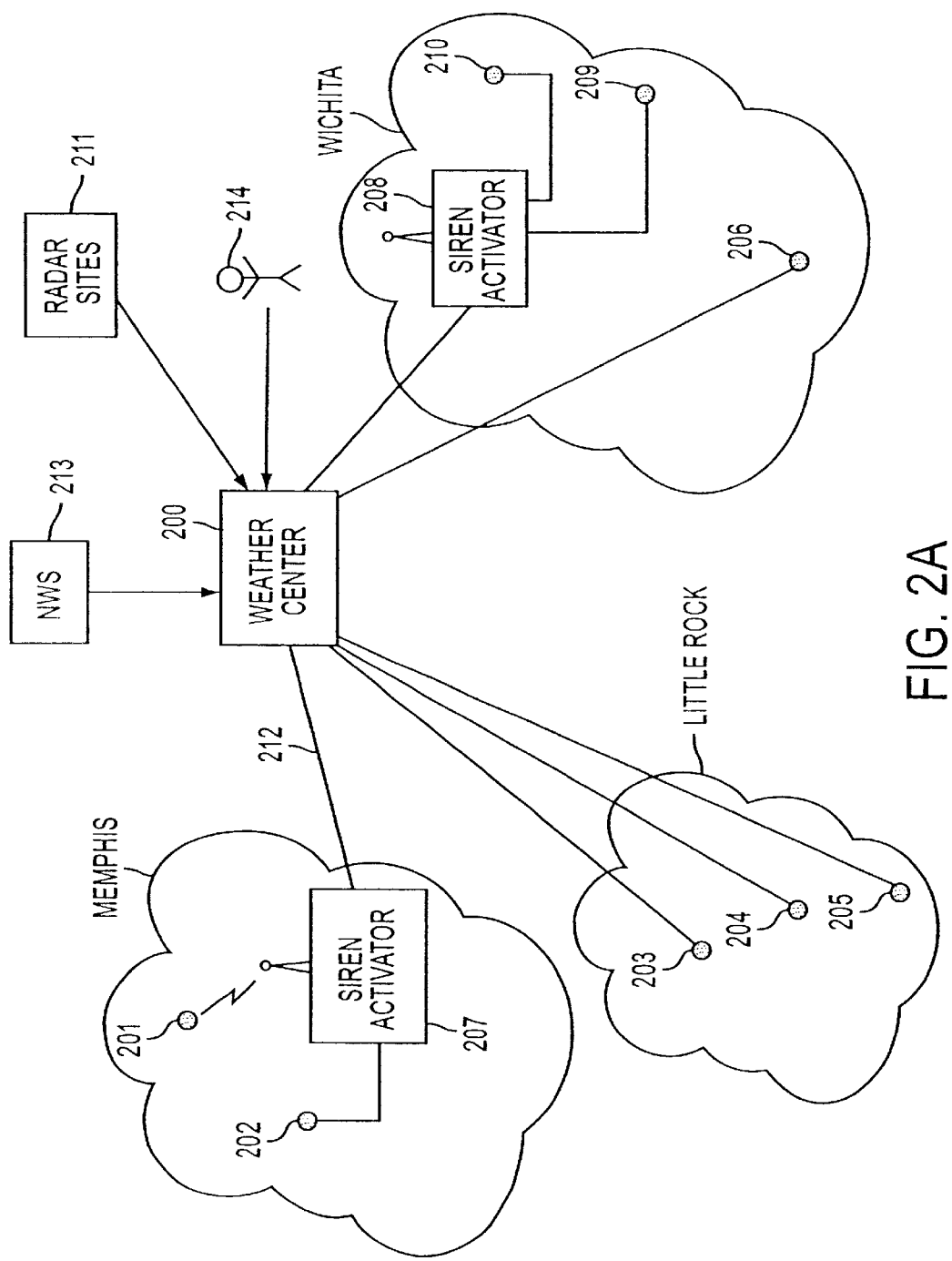
FIG. 2A shows a system and method for activating one or more warning devices in one or more geographically dispersed areas according to one variation of the invention.

FIG. 2A shows a system and method for activating warning devices in one or more geographically dispersed areas according to one variation of the invention. As shown in FIG. 2A, three different geographically dispersed areas (Memphis, Little Rock, and Wichita) each include a plurality of warning devices of the type exemplified by those manufactured by Federal Signal Corporation or SafetyCom Inc. Although it is preferred that each device be activated over a land line (e.g., a land-based direct line or frame relay line) rather than a radio frequency channel in order to provide better assurance of communication quality, the invention is not limited in this respect.

If telephone activation is used, it may be necessary to modify or supplement each device with a telephone receiving control unit that responds to a telephone call and, through a DTMF sequence, receives a code that activates the device and provides confirmation that the device has been activated. For example, each warning device can be assigned to a distinct telephone number that rings to an automated call pick-up unit. The automated pick-up unit answers the line, responds to a known activation code (which may include several digits as a security precaution) and, in response to detecting the correct activation code, activates the warning device and transmits an acknowledgement signal over the telephone line. In one variation, each unit can be activated by a human (e.g., by a cellular or conventional telephone dial-in procedure). In another variation, each unit can be activated by a computer-controlled siren activator 207 or via long-distance telephone lines 212 (including, for example, frame relay lines) from a weather center 200. Alternatively, a conventional siren activator can be used to activate one or more warning devices, but the activator is instructed as to which warning devices(s) to activate from a remote weather center 200.

As shown in FIG. 2A, two warning devices 201 and 202 are activated from a siren activator 207 that receives computer instructions via communication lines 212 from a weather center 200. Weather center 200 receives meteorological data in the form of radar images from various radar sites 211 and other information such as reports indicating the current latitude and longitude of a tornado. Additionally, weather reports can be received from one or more "spotters" 214 who actually see a tornado or tornado-like conditions. In the latter case, each spotter can provide the latitude and longitude coordinates of the tornado, or such information can be provided automatically using a GPS-equipped device and transmitted to weather center 200.

Weather center 200 monitors weather conditions around various geographic areas such as Memphis, Wichita, and Little Rock, and optionally predicts a future path of tornados that are detected near any of these areas using conventional meterological techniques. Weather center 200 also maintains information regarding the positional location (e.g., latitude and longitude) of each warning device in each geographic area. In response to detecting that a tornado is actually or predicted to be near one or more of the warning devices, weather center 200 transmits activation signals over the communication lines to the appropriate siren activator and/or warning devices. In one embodiment, upon detecting that a weather event (e.g., a tornado) is actually or predicted to be a predetermined or user-selectable distance from a warning device, the warning device is activated.

The detection and activation can occur automatically by computer (e.g., all warning devices that are determined to be within a given radius of a current or predicted tornado path), or it can be done manually through the use of trained meteorologists who render judgments based on their experience. In any event, as shown in FIG. 2A, a plurality of different geographically dispersed localities can receive tornado activation service from a central weather center 200, and thus need not employ personnel to monitor and activate the warning devices in each jurisdiction. In a preferred embodiment, each warning device and/or siren activator responds to an activation signal with a confirmatory signal confirming that activation has occurred. The confirmed activation can then be displayed on a computer display at weather center 200 or at other computer locations.

In one embodiment, activation information and meteorological information is transmitted over telephone lines or the Internet to municipal authorities in each jurisdiction to provide confirmation that action has been taken in response to a tornado threat. The combination of meteorological expertise and prediction facilities at weather center 200 with remote activation capabilities provides improved service at reduced cost to the municipalities.

Tornado warnings from the National Weather Service (in the form of county-wide warnings and/or specific LAT/LON information) can be used in weather center 200 to activate regional warning devices in different geographically dispersed regions. For example, if the NWS issues a tornado warning for Memphis and one for Wichita, weather center 200 can automatically transmit an activation code to activate all warning devices in those municipalities, without requiring intervention by a human operator in those municipalities. Alternatively, if specific LAT/LON information is received from the NWS, weather center 200 can activate specific warning devices in separate municipalities based on the information, again without requiring employees in each jurisdiction to monitor and/or activate sirens.

Figure 2B:
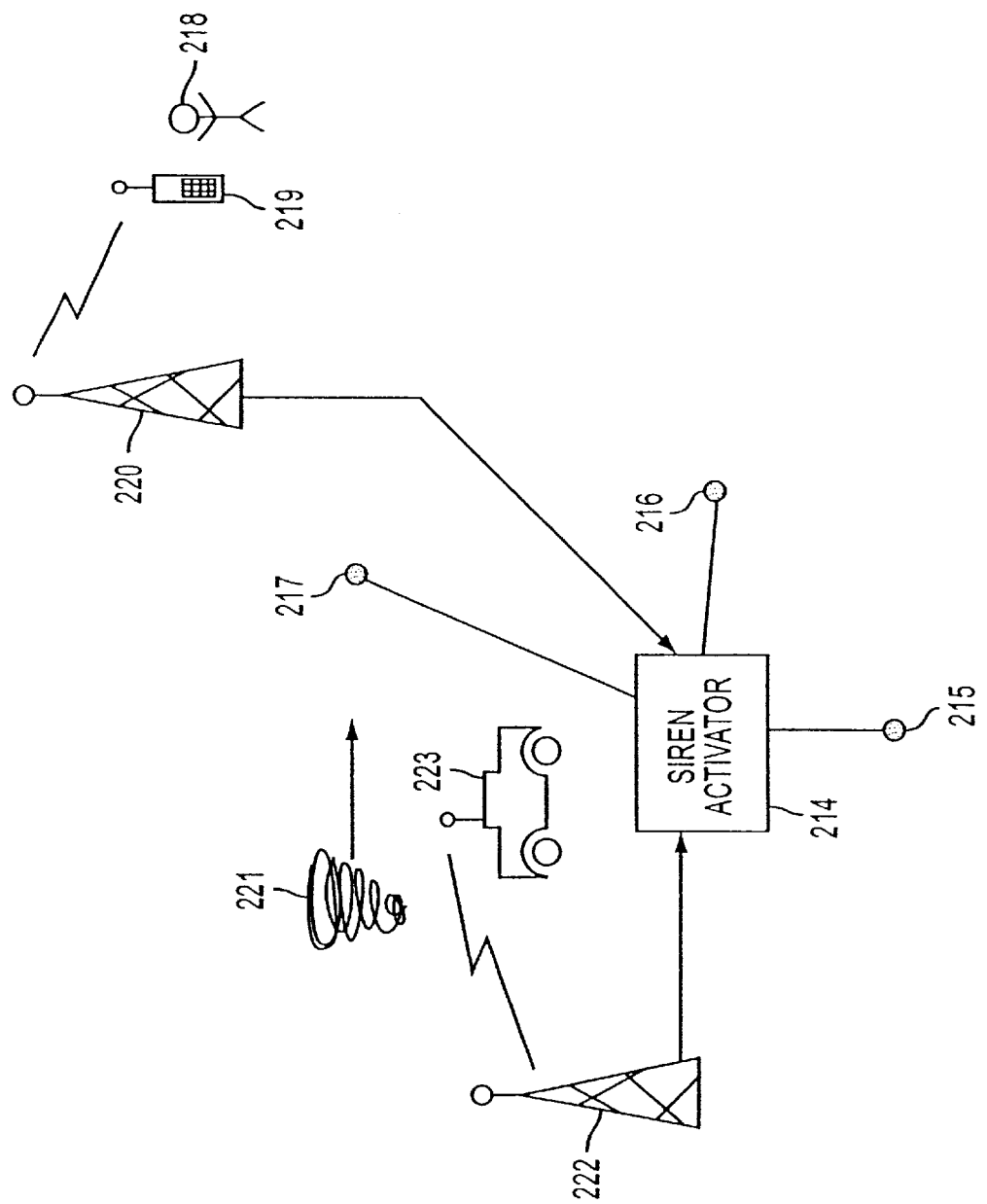
FIG. 2B shows a system and method for activating one or more warning devices remotely through the use of cellular telephones or other wireless devices according to another variation of the invention.

FIG. 2B shows a system and method for activating one or more warning devices remotely through the use of cellular telephones or other wireless devices according to another variation of the invention. As shown in FIG. 2B, a siren activator 214 is coupled to a plurality of warning devices 215 through 217 through telephone lines. Siren activator 214 may comprise a modified version of a device manufactured by one of the aforementioned companies that is configured to receive codes via telephones (including cellular telephones) indicating which warning device(s) should be activated. According to this embodiment, spotters 218 and 223 visually observe a tornado 221 and place a telephone call to a predetermined telephone number, which responds with an automated message to enter an activation code corresponding to one or more sirens. Alternatively, each spotter can enter his or her latitude and longitude corresponding to the observed or estimated location of the tornado, and siren activator 214 activates all warning devices that are within a certain range of the tornado location.

In yet another variation, spotters may use a wireless device equipped with a GPS receiver, which automatically transmits the spotter's current location at the push of a button. For example, a wireless hand-held computing device such as a Palm Pilot™ VII manufactured by the Palm Corporation can be used to transmit the user's current location to a wireless address, telephone number (e.g., through a cellular telephone antenna 220), or Internet address along with an activation code and/or security code. In one embodiment, the hand-held unit displays a map showing the user's current location, and has superimposed thereon the location of one or more warning devices located in the geographic vicinity of the displayed map. Using a stylus or other input device, the spotter can activate a warning device by selecting it on the display and entering a security code or other information to cause a signal to be transmitted to the indicated warning device. Alternatively, the spotter can transmit a current location (e.g., as obtained by GPS) to a central device activator, which then selects one or more warning devices that are in the proximity of the current location of the spotter.

Such devices can also be used in the system of FIG. 2A in order to transmit spotter information to weather center 200. While the remote activation scheme is illustrated as relying on a central siren activator 214, it will be appreciated that each spotter can directly contact and activate warning devices if each device is coupled to a telephone line or computer device capable of receiving an activation code.

Figure 2C:
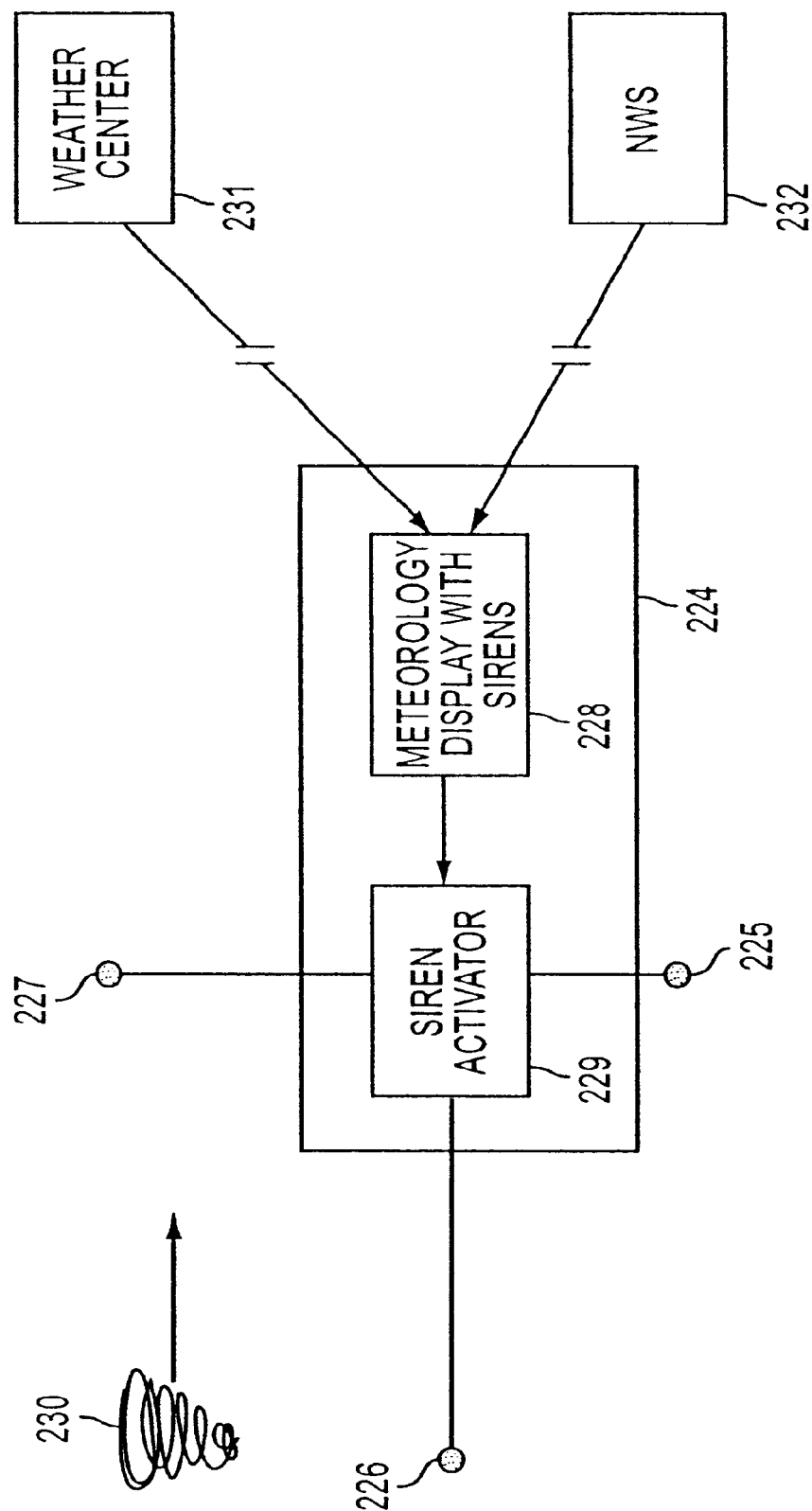
FIG. 2C shows a system and method for selecting one or more warning devices based on a meteorological display that shows the location of warning devices according to another variation of the invention.

FIG. 2C shows yet another variation of the invention, wherein an activation center 224 includes a computer with display 228 and a siren activator 229. The computer 228 receives meteorological information in the form of current and/or predicted tornado positions from external sources, such as weather center 231 and/or the National Weather Service 232, and superimposes that information on a computer map showing the location of each of a plurality of warning devices 225 through 227. A human user visually observes the actual and/or predicted path of the tornado on the display of computer 228 and, through the use of a keyboard, trackball, mouse, or other input device, graphically selects one or more warning devices that are in the path of the tornado.

Activation can occur over the Internet, through telephone dial-up lines, cellular telephone channels, and the like. The meteorological data and warning device locational data may be displayed using web pages and a web browser. In one embodiment, hyperlinks associated with each warning device can be selected by a user in order to activate the warning device.

In addition to traditional warning devices such as sirens, the activation signal can be fed to cable television distribution facilities that service particular geographic areas, such that a warning can be displayed on televisions associated with a particular geographic area (e.g., specific neighborhoods or houses). Additionally, activation signals can be transmitted to web sites and other computer systems for further use such as display purposes (e.g., display on web pages, wireless devices, cellular telephones, and the like).

In one variation of the invention, computer 228 automatically calculates which of the warning devices are within a predetermined distance from the predicted tornado path and suggests activation to the user. The selection can be temporally based, such that as new information becomes available (e.g., the tornado changes course), certain warning devices are automatically de-activated while others are activated.

Figure 3:
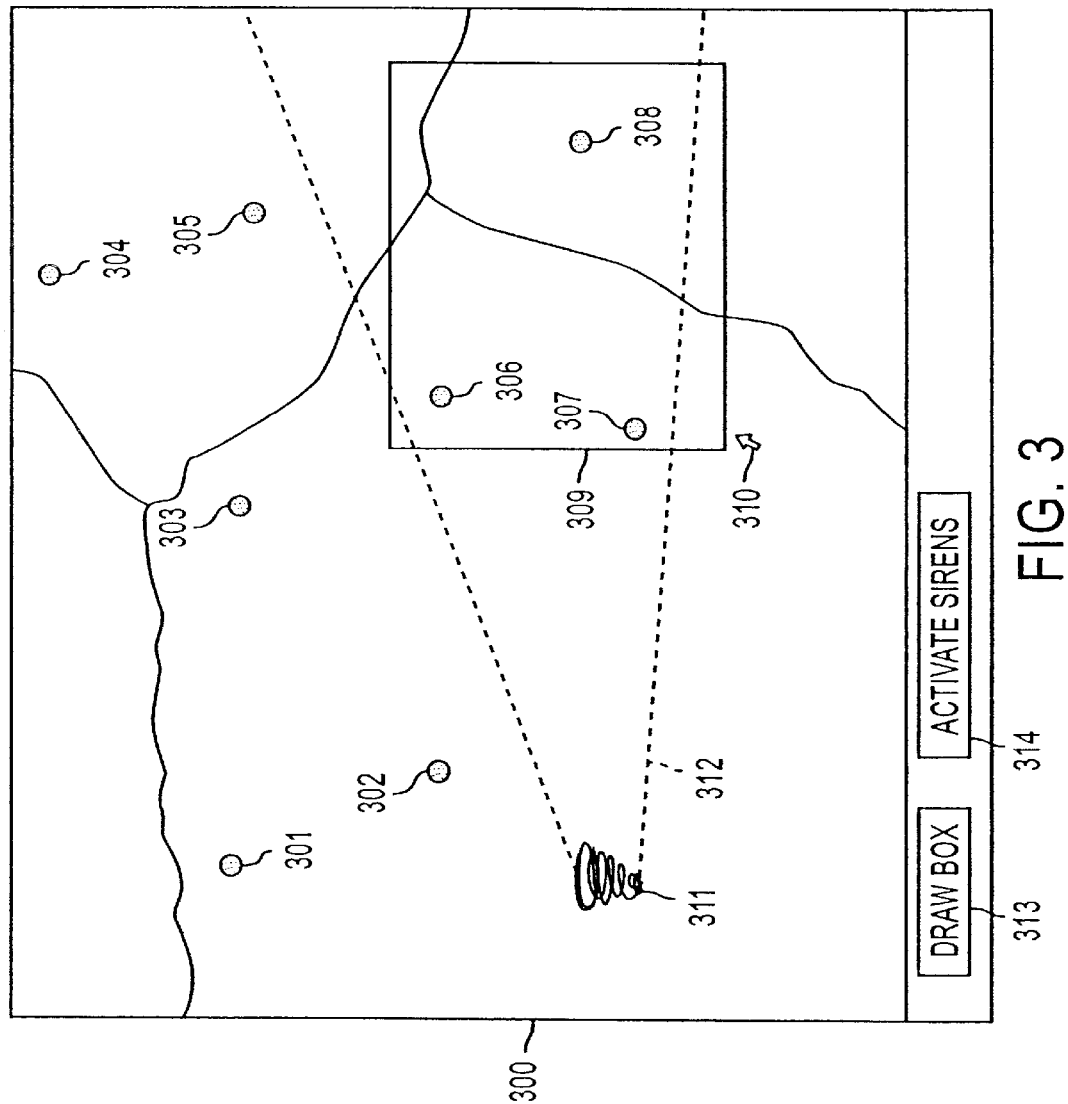
FIG. 3 shows one possible computer display and selection method for selecting a group of warning devices 309 and activating sirens in the selected group.

FIG. 3 shows one possible computer display and selection method for selecting a group of warning devices 309 and activating sirens in the selected group. The computer display 300 can be used in the weather center 200 of FIG. 2A to remotely activate one or more warning devices located in geographically disparate regions, or in a regional activation center 224 of the type shown in FIG. 2C.

As shown in FIG. 3, the computer display 300 has superimposed thereon a geographic map showing the location of a plurality of warning devices 301 through 308. The warning devices may span one or more counties, cities, or other municipal regions. A tornado 311 and/or other meteorological data is superimposed on the map in such a way that the location of the tornado relative to the warning devices can be visually observed. Additionally, a predicted path 312 of the tornado, such as a computer-generated prediction or simulation, can also be superimposed on the display in such a way that the future path of the tornado relative to the warning devices can be visually discerned.

A user of the computer system shown in FIG. 3 uses a cursor 310 and one or more control elements 313 and 314 to draw a box 309 around a subset of the warning devices (306, 307, and 308) that are visually determined to be in the path of the oncoming tornado. After selecting a group of warning devices in this fashion, the user can activate the warning devices using an activation button 314. In one embodiment, the user is prompted to enter a password or other authenticating information to prevent the accidental or false activation of warning devices. After selecting and activating the warning devices, the computer transmits codes to the selected warning devices and, upon receiving confirmation from the warning devices that they have been activated, displays them in a different color on the computer display to confirm that they have been correctly activated.

As explained above, in one variation of the invention, the computer automatically identifies those warning devices that are within a predetermined or user-selected distance from the current and/or predicted path of the tornado (e.g., during a time period spanning 30 minutes). After the computer selects the warning devices, the user is prompted to confirm activation of the computer-selected warning devices. It is a straightforward task to program a computer with software to compare the geographic location of each of a plurality of warning devices to an actual or predicted path of a tornado, and no further elaboration is required.

In one variation, the computer can automatically activate the warning devices without user intervention by comparing tornado location information to warning device locations and activating those warning devices that are within a predetermined range of the tornado location or its predicted path. The activation can also occur in a staggered time sequence, such that warning devices are automatically activated and deactivated as the tornado approaches different areas serviced by the warning devices.

Figure 4:
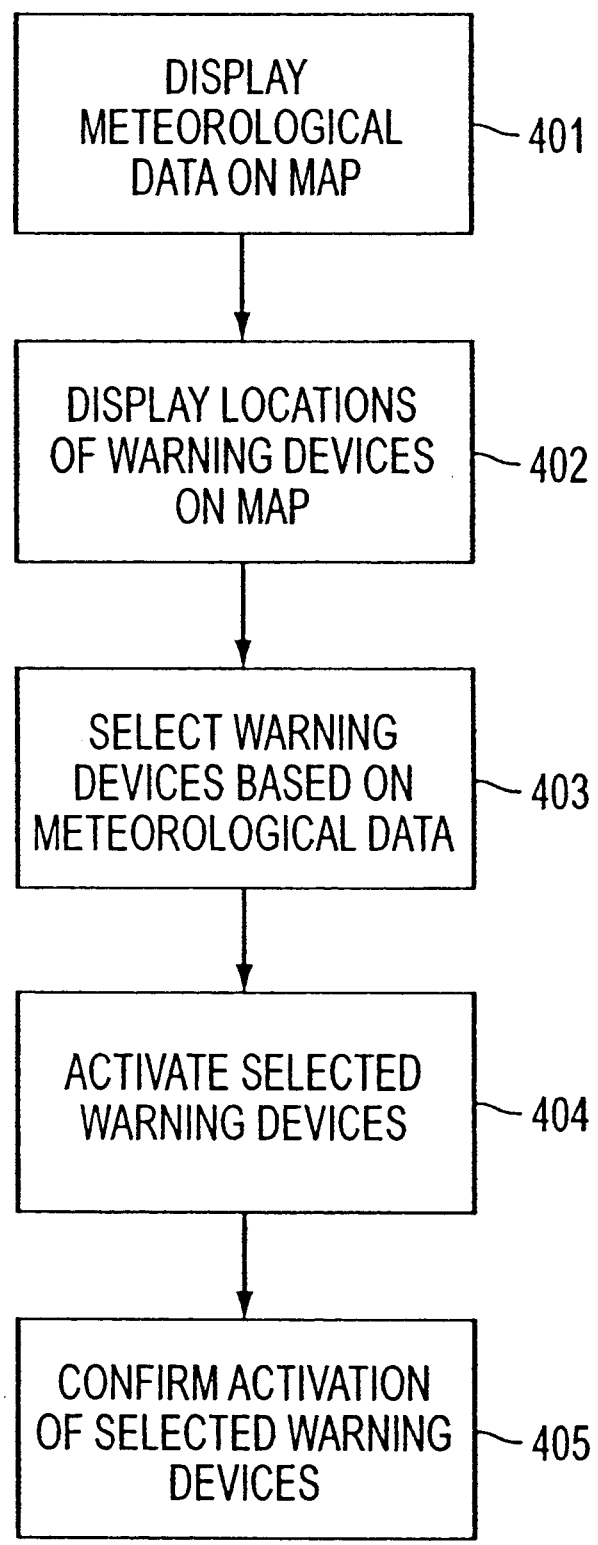
FIG. 4 shows steps for selecting and activating warning devices on the basis of meteorological data that is displayed on a computer screen.

FIG. 4 shows steps for selecting and activating warning devices on the basis of meteorological data that is displayed on a computer screen. The method of FIG. 4 can be practiced at a central weather center such as center 200 of FIG. 2A, or at a regional control center such as center 224 of FIG. 2C.

Beginning in step 401, a computer generates a display of meteorological data on a map. The data can include radar reflectivity data such as that generated by NEXRAD radars operated by the National Weather Service; "slime track" information showing the position of observed or actual tornados over a period of time; meteorologist-entered information such as the suspected location of a tornado or other severe weather event; information derived from spotters; and other data tending to show a severe weather event such as a tornado. In one embodiment, this information can also include predicted future storm or tornado tracks that are predicted using any of various technologies, such as those illustrated in U.S. Pat. No. 5,959,567, entitled "Method and Apparatus for Tracking of Organized Storms."

The future path of a tornado or other severe weather event can be predicted in various ways. As noted above, a future storm path can be predicted using an algorithm of the type described in the '567 patent. In another embodiment, a future path can be predicted using human judgment (e.g., trained meteorologists monitoring various radar data and other sensed information). In yet another embodiment, a projected path as provided by the National Weather Service (NWS) can be used. The NWS often provides an array of points or "dots" that can be connected to determine the path along which a tornado or hurricane is expected to move. The swath cut by the projected path may intersect the range of one or more warning devices, which can then be automatically activated by computer.

A tornado location can be heuristically determined using a combination of radar echo shape ("hook" echo), radar wind velocity and echo structure, all well known in the meteorological community. Once the initial position is determined, a predicted future location can be predicted using the principles set forth in the '567 patent, or a meteorologist can use his or her judgment to establish a projected future path. The National Weather Service transmits a Tornado Detection Algorithm (TDA) in its WSR-88 radar data stream, and this TDA position could thus also be used. The NWS also uses its own movement algorithms, which could be employed in conjunction with the principles of the invention. Finally, information supplied by "spotters" can be used in conjunction with any of the above techniques in order to pinpoint the location of an actual tornado.

In step 402, the locations of warning devices such as tornado sirens is also displayed on the same map as the meteorological data. This allows a user to visually compare the location of the meteorological event with the location of the warning devices. This step can be optional, particularly if the computer automatically selects warning devices on the basis of meteorological data.

In step 403, specific warning devices are selected based on the meteorological data. As shown in FIG. 3, for example, a human can select a group of one or more warning devices that are in the path of an impending or predicted tornado. Alternatively, the computer can automatically select and activate specific warning devices on the basis of the actual or predicted path of the tornado or other event.

In step 404, the selected warning devices are activated, either by a human user or by computer. The activation can occur over telephone land-lines, frame relay networks, the Internet, or by other means.

Finally, in step 405 the activated devices provide confirmation that they have been activated, and their activated state is optionally displayed on the computer display to provide visual assurance that activation has occurred.

It will be appreciated that the warning device can be any type of device capable of issuing a warning in conjunction with a severe weather event, such as a tornado, hurricane, lightning, wind shear, or the like. The warning device can be associated with or service a geographic region, a corporate facility, an airport, factory, or any other entity or geographic area. Warnings can be issued in the form of sound, visual, radio frequency, television, telephonic, and the like.

In one embodiment, a computer automatically calls residents having telephone numbers corresponding to an area for which a severe weather event is occurring or projected to occur, and plays a recorded message indicating the nature of the threat. In such an embodiment, the warning device itself need not be located in the area of the threat; instead, the warning is communicated to persons located in the affected area by a computer that is potentially located outside the affected area. Databases containing telephone numbers and street addresses corresponding to the numbers can be searched automatically by computer once the geographic area subject to threat (e.g., including streets, zip codes, or the like) is known. This technique is analogous to the "reverse 911" automated calling process used by police departments to transmit information concerning recent crimes in a given neighborhood.

What has been described above is merely illustrative of the application of the principles of the present invention. Other arrangements and methods can be implemented by those skilled in the art without departing from the spirit and scope of the present invention. Any of the methods of the invention can be implemented in software that can be stored on computer disks or other computer-readable media for execution in a host or target computer. The invention can be implemented using web browser technology, handheld computing units, and/or cellular telephones. Moreover, while the illustrative example of tornado warnings has been used in the description, the invention is applicable to other types of weather warnings such as lightning, hail, hurricanes, wind shear, and the like, and the inventive principles can be applied equivalently to such phenomena.

For example, warnings may be issued based on the threat of a flash flood. Weather center 200 may receive comprehensive weather information from the National Weather Service 213 and other radar sites 211, and display on computer display 300 radar estimates of rainfall amounts, as well as actual and predicted flood stages, superimposed over a warning device array. Weather information may be displayed by county or, alternatively, in latitude/longitude format. Weather center 200 may also receive rain gauge and river stage data to assist an operator or automated algorithm in making a warning decision. The warning devices depicted may include flash flood warning sirens or lights, gates that may automatically close in order to alter the effect or course of the flash flood or to divert traffic away from the flash flood, or any other warning or prevention device. A human operator may then interpret the meteorological information superimposed over the warning device array and select one or more devices to activate, as shown in FIG. 3. Alternatively, an automated application program may receive and interpret the data, and selectively activate one or more devices based on the received data.

In another example, weather center 200 may track and plot the location(s) of current lightning strikes, including at least cloud-to-ground lightning strikes, as well as forecast locations of lightning strikes. Weather center 200 may display forecast locations of lightning strikes at one or more times in the future, such as 10 minutes, 20 minutes, and 30 minutes into the future, superimposing the present strikes and each predicative forecast over a warning device array displayed on computer display 300. A human operator can manually make a warning decision and activate one or more warning devices or, alternatively, an application program can automatically interpret the received data and activate one or more warning devices. Preferably, lightning warning devices should be located in areas likely to affected by lightning strikes, such as athletic fields, golf courses, outdoor aquatic recreation areas, and the like.

In yet another example, warnings may be issued based on non-meteorological events, such as a release of a hazardous material, volcanic eruption, air pollution, and the like. Weather center 200 may receive environmental warnings from the NWS, Environmental Protection Agency (EPA), or any other government or independent source. In one embodiment, weather center 200 may forecast a plume that illustrates the likely path and concentration of the released hazardous material, and display the plume forecast on computer display 300 superimposed over the warning device array. Alternatively, weather center 200 might not calculate the plume forecast, but instead may receive the plume forecast from a third party (NWS, EPA, etc.). Based on the plume forecast superimposed over the warning device array, a human operator can manually make a warning decision and activate one or more warning devices or an application program can automatically interpret the received data and activate one or more warning devices.

In some embodiments warnings may be tailored to a mobile warning device. For example, in an embodiment where a warning device comprises a mobile telephone, handheld computing device, or other mobile device, the weather center may periodically receive updated location information corresponding to the mobile warning device, and update the warning device's location in the device array displayed on computer display 300. Thus, a human operator or an automated program will have the warning device's correct location when making warning decisions. If the warning device's present location falls within an area selected to receive a warning according to any of the aspects or embodiments disclosed herein, the warning device receives the warning information and responds accordingly.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. No claim should be interpreted to be in means plus function format. Numbered steps in method claims should not be interpreted to require a particular ordering of the steps.

What is claimed is:

1. A method of remotely activating a selected one or more of a plurality of warning devices, comprising the steps of:
    (1) at a location of a hazardous event, observing conditions associated with the hazardous event;
    (2) from the location of the hazardous event, wirelessly transmitting an activation code, wherein the activation code corresponds to a specified one of the plurality of warning devices; and
    (3) in response to receiving the activation code, activating the specified one of the plurality of warning devices;
    wherein step (2) comprises the step of using an input device of a handheld computing device to select one of the plurality of warning devices.

2. The method of claim 1, wherein step (2) comprises the step of selecting the one warning device based on a geographic display of warning devices appearing on the handheld computing device.

3. A computer-implemented method of activating a warning device, comprising the steps of:
    (1) displaying on a computer display device hazardous event information for a particular geographic region and displaying on the same display device information representing the geographic location of a plurality of warning devices;
    (2) selecting one or more of the plurality of warning devices displayed on the computer display device; and
    (3) remotely activating the one or more warning devices selected in step (2).

4. The computer-implemented method of claim 3, wherein step (1) comprises the step of displaying an actual or predicted flash flood location as part of the hazardous event information.

5. The computer-implemented method of claim 4, wherein at least one warning device comprises a flood gate, and step (3) comprises closing the flood gate.

6. The computer-implemented method of claim 3, wherein step (1) comprises the step of displaying a predicted hazardous chemical plume as part of the hazardous condition information.

7. The computer-implemented method of claim 6, wherein step (1) comprises the step of displaying a predicted future path of a hazardous chemical plume in relation to the plurality of warning devices.

8. The computer-implemented method of claim 3, wherein step (1) comprises the step of displaying a predicted lightning strike location as part of the hazardous condition information.

9. The computer-implemented method of claim 8, wherein step (1) comprises the step of displaying a predicted future lightning strike in relation to the plurality of warning devices.

10. The computer-implemented method of claim 3, wherein step (2) comprises the step of using a computer input device to encircle a plurality of warning devices on the computer display device.

11. The computer-implemented method of claim 3, wherein step (3) comprises the step of prompting a user for an authentication code prior to activating the one or more warning devices.

12. The computer-implemented method of claim 3, wherein step (2) is performed automatically by computer without human intervention.

13. The computer-implemented method of claim 3, wherein steps (2) and (3) are both performed automatically by computer.

14. The computer-implemented method of claim 13, further comprising the step of activating additional warning devices based on an updated prediction of the hazardous event.

15. The computer-implemented method of claim 3, further comprising the steps of:
    (4) receiving a confirmation signal from each warning device that was activated; and
    (5) displaying on the computer display an indication that each warning device was activated.

16. The computer-implemented method of claim 3, further comprising the step of receiving from an external source information identifying the location of the hazardous event, and wherein step (2) includes selecting warning devices based on the location of the hazardous event.

17. The computer-implemented method of claim 3, wherein steps (1) to (3) are performed at a centrally located prediction center located in a first municipal area, and wherein the plurality of warning devices are located in a second municipal area.

18. The computer-implemented method of claim 17, further comprising the step of repeating steps (1) to (3) from the central prediction center for a plurality of different geographically dispersed areas having different networks of warning devices.

19. The computer-implemented method of claim 3, further comprising the step of receiving information from a spotter regarding an observed location of a specific hazardous event, and wherein step (2) comprises the step of using the observed location of the specific hazardous event to select the one or more warning devices.

20. The computer-implemented method of claim 3, wherein steps (1) to (3) are performed in a geographic region in which the warning devices are located.

21. The computer-implemented method of claim 3, wherein step (3) comprises the step of activating the selected warning devices over a frame relay network from a central location located at great distance from the warning devices.

22. A computer-implemented method of activating a warning device, comprising the steps of:

(1) at a central location that generates predictions corresponding to hazardous conditions, detecting that a hazardous event is likely to strike a given geographic location;

(2) at the central location, using a computer to compare the location of the hazardous event to a plurality of geographically dispersed warning devices located in a geographic region different from the central location and selecting one or more of the geographically dispersed warning devices in response to the comparison; and (3) remotely activating the selected one or more geographically dispersed warning devices, wherein step (2) comprises the step of using a computer input device to manually encircle a group of warning devices displayed on a computer display.

23. A computer-implemented method of activating a warning device, comprising the steps of:

(1) at a central location that generates predictions corresponding to hazardous conditions, detecting that a hazardous event is likely to strike a given geographic location;

(2) at the central location, using a computer to compare the location of the hazardous event to a plurality of geographically dispersed warning devices located in a geographic region different from the central location and selecting one or more of the geographically dispersed warning devices in response to the comparison;

(3) remotely activating the selected one or more geographically dispersed warning devices; and (4) receiving confirmation from each activated warning device and, in response thereto, updating a computer display.

24. A computer-implemented method for notifying a remote device, comprising the steps of:

(1) at a central location, receiving hazardous condition information for a particular geographic region, (2) selecting one or more of a plurality of remote devices that are predicted to be affected by a hazardous event corresponding to the hazardous condition information; and (3) sending alert information to the remote devices selected in step (2), wherein step (2) comprises using a computer input device to encircle a plurality of remote devices displayed on a display device.

25. A computer readable medium storing computer readable instructions that, when executed, cause a system comprised of at least one computer to perform a method for notifying a remote device, comprising the steps of:

(1) at a central location, receiving hazardous condition information for a particular geographic region, (2) selecting one or more of a plurality of remote devices that are predicted to be affected by a hazardous event corresponding to the hazardous condition information; and (3) sending alert information to the remote devices selected in step (2), wherein step (2) comprises using a computer input device to encircle a plurality of remote devices displayed on a display device.

26. A data processing system comprising a processor and memory storing computer readable instructions that, when executed, cause the system to perform a method for notifying a remote device, comprising the steps of:

(1) receiving hazardous condition information for a particular geographic region, (2) selecting one or more of a plurality of remote devices that are predicted to be affected by a hazardous event corresponding to the hazardous condition information; and (3) sending alert information to the remote devices selected in step (2), wherein step (2) comprises using a computer input device to encircle a plurality of remote devices displayed on a display device.

\* \* \* \* \*